(12) United States Patent
Fu et al.

(10) Patent No.: US 12,744,702 B2
(45) Date of Patent: Sep. 22, 2026

(54) COMMUNICATION METHOD, USER EQUIPMENT AND STORAGE MEDIUM

(71) Applicant: Samsung Electronics Co., Ltd., Gyeonggi-do (KR)

(72) Inventors: Jingxing Fu, Beijing (CN); Feifei Sun, Beijing (CN); Sa Zhang, Beijing (CN)

(73) Assignee: Samsung Electronics Co., Ltd (KR)

( * ) Notice: Subject to any disclaimer, the term of this patent is extended or adjusted under 35 U.S.C. 154(b) by 34 days.

(21) Appl. No.: 18/842,197

(22) PCT Filed: Apr. 27, 2023

(86) PCT No.: PCT/KR2023/005808
§ 371 (c)(1),
(2) Date: Aug. 28, 2024

(87) PCT Pub. No.: WO2023/211222
PCT Pub. Date: Nov. 2, 2023

(65) Prior Publication Data

US 2025/0184203 A1 Jun. 5, 2025

(30) Foreign Application Priority Data

Apr. 27, 2022 (CN) ......................... 202210458828.6
Dec. 27, 2022 (CN) ......................... 202211689941.1

(51) Int. Cl.
*H04L 27/26* (2006.01)
*H04L 5/00* (2006.01)
*H04W 72/0453* (2023.01)

(52) U.S. Cl.
CPC ........ *H04L 27/2666* (2013.01); *H04L 5/0044* (2013.01); *H04W 72/0453* (2013.01)

(58) Field of Classification Search
CPC ............. H04W 72/23; H04W 72/0453; H04W 72/232; H04W 72/0446; H04W 72/1268;
(Continued)

(56) References Cited

U.S. PATENT DOCUMENTS

2021/0352696 A1* 11/2021 Yoshimura ........ H04W 72/1273
2022/0068653 A1 3/2022 Posseme et al.
(Continued)

FOREIGN PATENT DOCUMENTS

WO WO 2021/146702 7/2021

OTHER PUBLICATIONS

3GPP TS 38.213 V17.1.0, (Mar. 2022), pp. 245.
(Continued)

*Primary Examiner* — Eva Y Puente
(74) *Attorney, Agent, or Firm* — The Farrell Law Firm, P.C.

(57) ABSTRACT

The disclosure relates to a 5G or 6G communication system for supporting a higher data transmission rate. Embodiments of the disclosure provide a communication method, a user equipment and a readable storage medium, and relate to the technical field of communication. The method comprises: determining first uplink resources and a first transmission mode based on configuration information transmitted by a base station; and, determining second uplink resources from the first uplink resources, and transmitting an uplink channel or an uplink signal based on the second uplink resources and the first transmission mode. According to the method in the embodiments of the disclosure, the existing wireless communication mode may be improved to better satisfy the communication requirements.

16 Claims, 14 Drawing Sheets

(58) Field of Classification Search
CPC .......... H04W 72/0457; H04W 72/1273; H04L 5/0053; H04L 5/0094; H04L 5/001; H04L 5/0044; H04L 5/0055; H04L 5/0048; H04L 1/1854; H04L 1/1812; H04L 5/0092; H04L 1/1896; H04L 5/0051; H04L 5/14; H04L 1/1861; H04B 7/0626; H04B 7/024; H04B 7/0456; H04B 1/713; H04B 7/0413; H04B 17/318; H04B 7/06952; H04B 7/18513
See application file for complete search history.

(56) References Cited

U.S. PATENT DOCUMENTS

2022/0086853 A1 3/2022 Xiao et al.
2023/0199648 A1* 6/2023 Li .......................... H04W 24/08 370/311
2024/0206011 A1* 6/2024 Godin .................... H04W 76/40
2025/0089031 A1* 3/2025 Shim ...................... H04L 5/0044
2025/0343646 A1* 11/2025 Chen ...................... H04L 5/0094

OTHER PUBLICATIONS

Mediatek Inc., "Basic Framework for Bandwidth Part Operation", R2-1710864, 3GPP TSG-RAN WG2 #99-bis, Oct. 9-13, 2017, 4 pages.
European Search Report dated Apr. 15, 2025 issued in counterpart application No. 23796864.9-1206, 9 pages.
PCT/ISA/210 Search Report dated Jul. 31, 2023, issued on PCT/KR2023/005808, pp. 3.
PCT/ISA/237 Written Opinion dated Jul. 31, 2023, issued on PCT/KR2023/005808, pp. 3.
Samsung, "Maintenance on PDSCH/PUSCH Enhancements for NR from 52.6 GHz to 71 GHz", R1-2200196, 3GPP TSG RAN WG1 #107b-e, Jan. 17-25, 2022, 26 pages.
Nokia et al., "PDSCH/PUSCH Enhancements", R1-2102562, 3GPP TSG RAN WG1 #104bis-e, Apr. 12-20, 2021, 29 pages.
Apple Inc., "Discussion on PDSCH and PUSCH Enhancements", R1-2111865, 3GPP TSG RAN WG1 #107-e, Nov. 11-19, 2021, 16 pages.
Apple Inc., "HARQ Feedback Enhancements for URLLC", R1-2107732, 3GPP TSG RAN WG1 #106-e, Aug. 16-27, 2021, 9 pages.

* cited by examiner

COMMUNICATION METHOD, USER EQUIPMENT AND STORAGE MEDIUM

PRIORITY

This application is a National Phase Entry of PCT International Application No. PCT/KR2023/005808, which was filed on Apr. 27, 2023, and claims priority to Chinese Patent Application Nos. 202210458828.6 and 202211689941.1, which were filed on Apr. 27, 2022, and Dec. 27, 2022, respectively, the entire content of each of which is incorporated herein by reference.

TECHNICAL FIELD

The disclosure relates to the communication technical field, and in particular to a communication method, a user equipment (UE) and a storage medium.

BACKGROUND ART

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE (Long Term Evolution) systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

In a communication system, transmission from a base station to a user equipment (UE) is called a downlink, and transmission from a UE to a base station is called an uplink. How to better improve the existing wireless communication ways and better meet the communication requirements is an important issue that those skilled in the art have been working hard to study.

5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI)

and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

The embodiments of the disclosure provide a communication method, a user equipment and a readable storage medium in order to improve the existing wireless communication mode to better satisfy the communication requirements.

Solution to Problem

The disclosure may provide the following technical solutions.

According to an embodiment, a method performed by a user equipment in a communication system is provided.

According to an embodiment, the method includes: determining first uplink resources and a first transmission mode based on configuration information transmitted by a base station; and determining second uplink resources from the first uplink resources, and transmitting an uplink channel or an uplink signal based on the second uplink resources and the first transmission mode.

According to an embodiment, the determining the second uplink resources from the first uplink resources includes: in a time unit, based on the indexes of the first uplink resources and/or the priority index of the uplink channel or the uplink signal transmitted on the first uplink resources, selecting uplink resources from the first uplink resources to determine the second uplink resources.

According to an embodiment, the process of selecting the uplink resources includes: selecting the uplink resources in an order from the highest to lowest according to the priority index of the uplink channel or uplink signal transmitted on each of the first uplink resources.

According to an embodiment, if the number of the selected uplink resources is greater than the first number, the process of selecting the uplink resources further includes: selecting the uplink resources from the selected first uplink resources corresponding to the same priority index according to the priority of the uplink channel or the uplink signal transmitted on the first uplink resources.

According to an embodiment, if the number of the selected uplink resources is greater than the first number, the process of selecting the uplink resources further includes: selecting the uplink resources from the selected first uplink resources corresponding to the same priority according to the indexes of the first uplink resources.

According to an embodiment, if the number of the selected uplink resources is greater than the first number, the process of selecting the uplink resources further includes: selecting the uplink resources from the selected first uplink resources according to the indexes of the first uplink resources; or, selecting the uplink resources from the selected first uplink resources corresponding to the same priority index according to the indexes of the first uplink resources.

According to an embodiment, the method further includes: cancelling the transmission of uplink channel or uplink signal on the unselected uplink resources.

According to an embodiment, the first transmission mode is a one-port transmission mode or a two-port transmission mode.

According to an embodiment, a method performed by a user equipment in a communication system is provided.

According to an embodiment, the method includes: receiving configuration information transmitted by a base station, the configuration information comprising a subcarrier spacing configuration of a bandwidth part (BWP) of at least one serving cell, a physical downlink control channel (PDSCH) and/or a physical uplink control channel (PUSCH) of the at least one serving cell being simultaneously scheduled by a downlink control information (DCI) format; determining a unit of reference frequency domain resource assignment based on subcarrier spacing configuration of a BWP of a scheduling serving cell or subcarrier spacing configuration of a BWP of a first scheduled serving cell, wherein a search space of the BWP of the first scheduled serving cell being linked with a search space of the BWP of the scheduling serving cell; and receiving a downlink channel or transmitting an uplink channel according to the determined unit of reference frequency domain resource assignment.

According to an embodiment, the determining the unit of reference frequency domain resource assignment includes: determining the unit of reference frequency domain resource assignment based on subcarrier spacing size corresponding to the subcarrier spacing configuration of the BWP of the scheduling serving cell; or, determining the unit of reference frequency domain resource assignment based on subcarrier spacing size corresponding to the subcarrier spacing configuration of the BWP of the first scheduled serving cell.

According to an embodiment, the configuration information further includes a search space identifier of the search space in the BWP of the scheduling serving cell and a search space identifier of the search space in the BWP of the scheduled serving cell; wherein the search space of the BWP of the scheduling serving cell and the search space of the BWP of the scheduled serving cell that have the same search space identifier are linked.

According to an embodiment, a method performed by a base station in a communication system is provided.

According to an embodiment, the method includes: determining a unit of reference frequency domain resource assignment based on subcarrier spacing configuration of a BWP of a scheduling serving cell or subcarrier spacing configuration of a BWP of a first scheduled serving cell, wherein a search space of the BWP of the first scheduled serving cell being linked with a search space of the BWP of the scheduling serving cell; transmitting configuration information to a UE, the configuration information comprising subcarrier spacing configuration of the BWP of at least one serving cell, a PDSCH and/or a PUSCH of the at least one serving cell being simultaneously scheduled by a DCI format; and transmitting a downlink channel or receiving an uplink channel according to the determined unit of reference frequency domain resource assignment.

According to an embodiment, the determining the unit of reference frequency domain resource assignment includes: determining the unit of reference frequency domain resource assignment based on subcarrier spacing size corresponding to the subcarrier spacing configuration of the BWP of the scheduling serving cell; or, determining the unit of reference frequency domain resource assignment based on the subcarrier spacing size corresponding to the subcarrier spacing configuration of the BWP of the first scheduled serving cell.

According to an embodiment, the configuration information further includes a search space identifier of the search space in the BWP of the scheduling serving cell and a search space identifier of the search space in the BWP of the scheduled serving cell; wherein the search space of the BWP of the scheduling serving cell and the search space of the BWP of the scheduled serving cell that have the same search space identifier are linked.

According to an embodiment, a user equipment (UE) is provided.

According to an embodiment, the UE includes: a transceiver; and a controller, which is coupled to the transceiver and configured to control to perform the method performed by the UE provided by the disclosure.

According to an embodiment, a base station is provided.

According to an embodiment, the base station includes: a transceiver; and a controller, which is coupled to the transceiver and configured to control to perform the method performed by the base station provided by the disclosure.

According to an embodiment, a computer-readable storage medium is provided, including computer programs stored thereon that, when performed by a processor, implement the method performed by a UE or the method performed by a base station provided by the disclosure.

According to an embodiment, a computer program product is provided, having computer programs that, when performed by a processor, implement the method performed by a UE or the method performed by a base station provided by the disclosure.

Advantageous Effects of Invention

In accordance with the communication method, the user equipment and the readable storage medium provided in the embodiments of the disclosure, the existing transmission mode may be improved to better satisfy the communication requirements by receiving configuration information transmitted by a base station and transmitting an uplink channel or an uplink signal based on the uplink resources and transmission mode determined by the configuration information.

BRIEF DESCRIPTION OF DRAWINGS

A detailed description and discussion of one or more embodiments of the subject matter of the disclosure is set forth to those of ordinary skill in the art in the following description with reference to the accompanying drawings.

The disclosure will be more readily understood from the following detailed description with reference to the accompanying drawings, wherein like reference numerals refer to like structural elements, in which.

MODE FOR THE INVENTION

Figure 1:
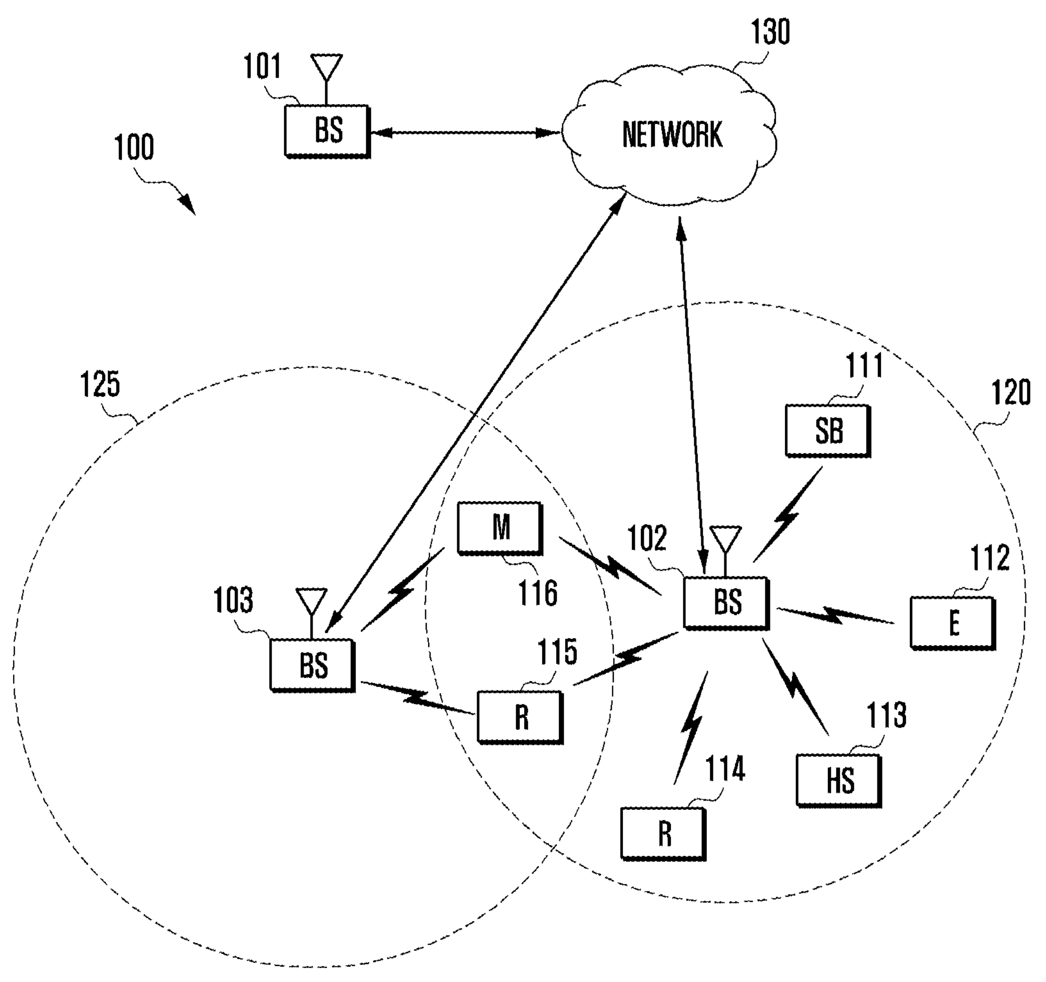
FIG. 1 is a schematic diagram of an overall structure of a wireless network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the disclosure belongs. Such terms as those defined in a generally used dictionary are to be interpreted to have the meanings equal to the contextual meanings in the relevant field of art, and are not to be interpreted to have ideal or excessively formal meanings unless clearly defined in the disclosure.

In order to make the purpose, technical solution and advantages of the disclosure clearer, the exemplary embodiments of the disclosure are further described below in conjunction with the accompanying drawings.

The text and drawings are provided as examples only to help readers understand the disclosure. They are not intended and should not be interpreted as limiting the scope of the disclosure in any way. Although certain embodiments and examples have been provided, based on the content disclosed herein, it is obvious to those skilled in the art that modifications to the illustrated embodiments and examples can be made without departing from the scope of the disclosure.

FIG. 1 illustrates an example wireless network 100 according to various embodiments of the disclosure. The embodiment of the wireless network 100 shown in FIG. 1 is for illustration only. Other embodiments of the wireless network 100 can be used without departing from the scope of the disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
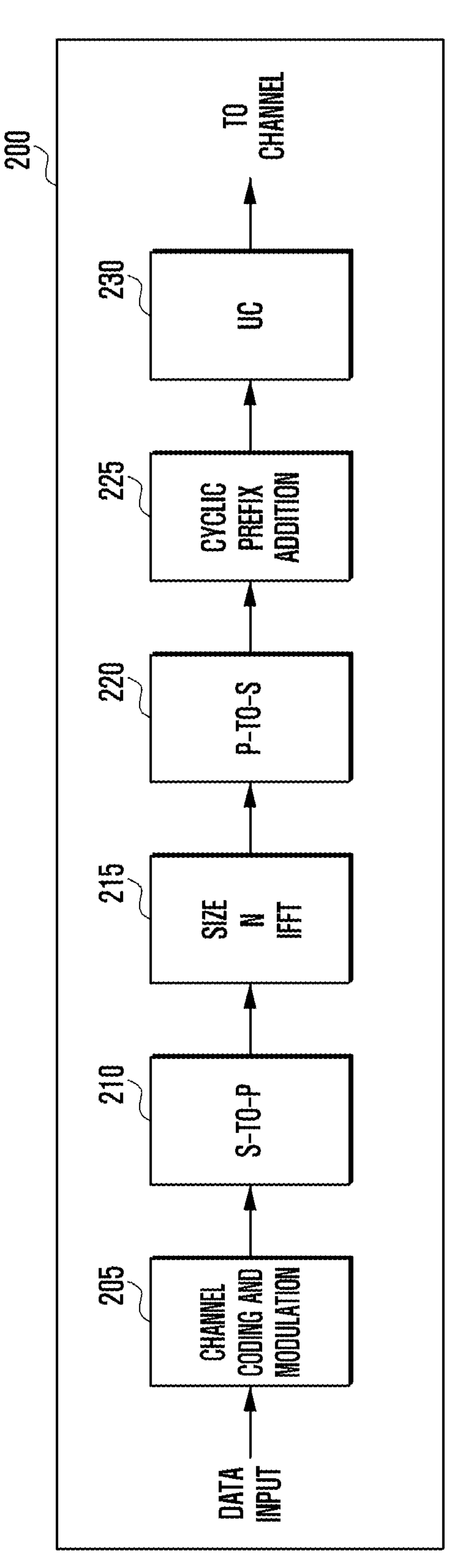
FIG. 2*a* is a schematic diagram of a transmitting path according to an embodiment of the disclosure.
Figure 2B:
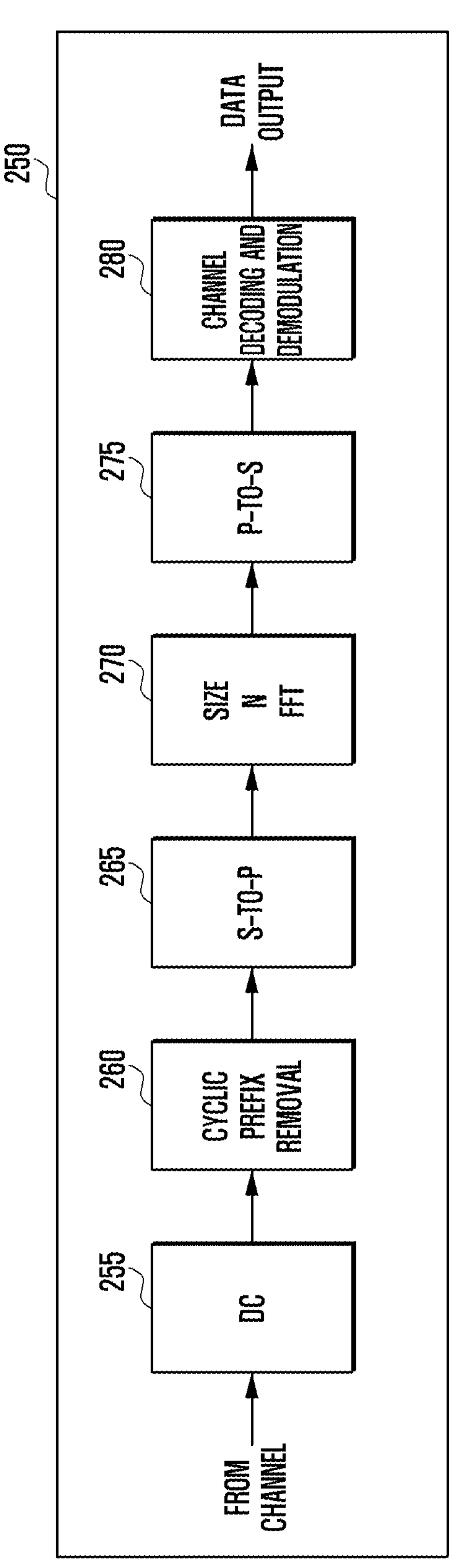
FIG. 2*b* is a schematic diagram of a receiving path according to an embodiment of the disclosure.

FIGS. 2*a* and 2*b* illustrate example wireless transmission and reception paths according to the disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2*a* and 2*b* can be implemented using only hardware, or using a combination of hardware and software/firmware. As a specific example, at least some of the components in FIGS. 2*a* and 2*b* may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2*a* and 2*b* illustrate examples of wireless transmission and reception paths, various changes may be made to FIGS. 2*a* and 2*b*. For example, various components in FIGS. 2*a* and 2*b* can be combined, further subdivided or omitted, and additional components can be added according to specific requirements. Furthermore, FIGS. 2*a* and 2*b* are intended to illustrate examples of types of transmission and reception paths that can be used in a wireless network. Any other suitable architecture can be used to support wireless communication in a wireless network.

Figure 3A:
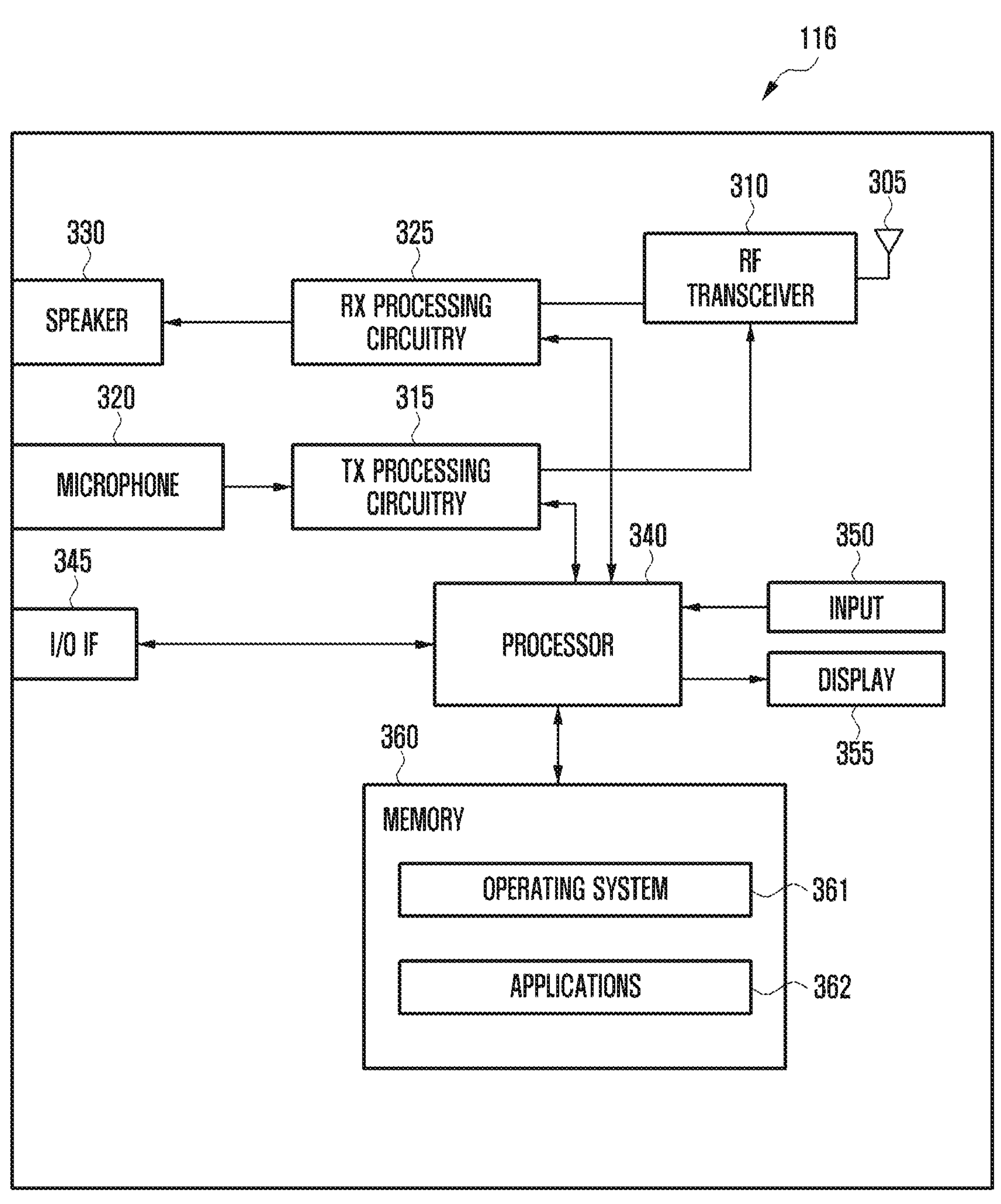
FIG. 3*a* is a schematic structure diagram of a UE according to an embodiment of the disclosure.

FIG. 3*a* illustrates an example UE 116 according to the disclosure. The embodiment of UE 116 shown in FIG. 3*a* is for illustration only, and UEs 111-115 of FIG. 1 can have the same or similar configuration. However, a UE has various configurations, and FIG. 3*a* does not limit the scope of the disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350.

The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3*a* illustrates an example of UE 116, various changes can be made to FIG. 3*a*. For example, various components in FIG. 3*a* can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3*a* illustrates that the UE 116 is configured as a mobile phone or a smart phone, UEs can be configured to operate as other types of mobile or fixed devices.

Figure 3B:
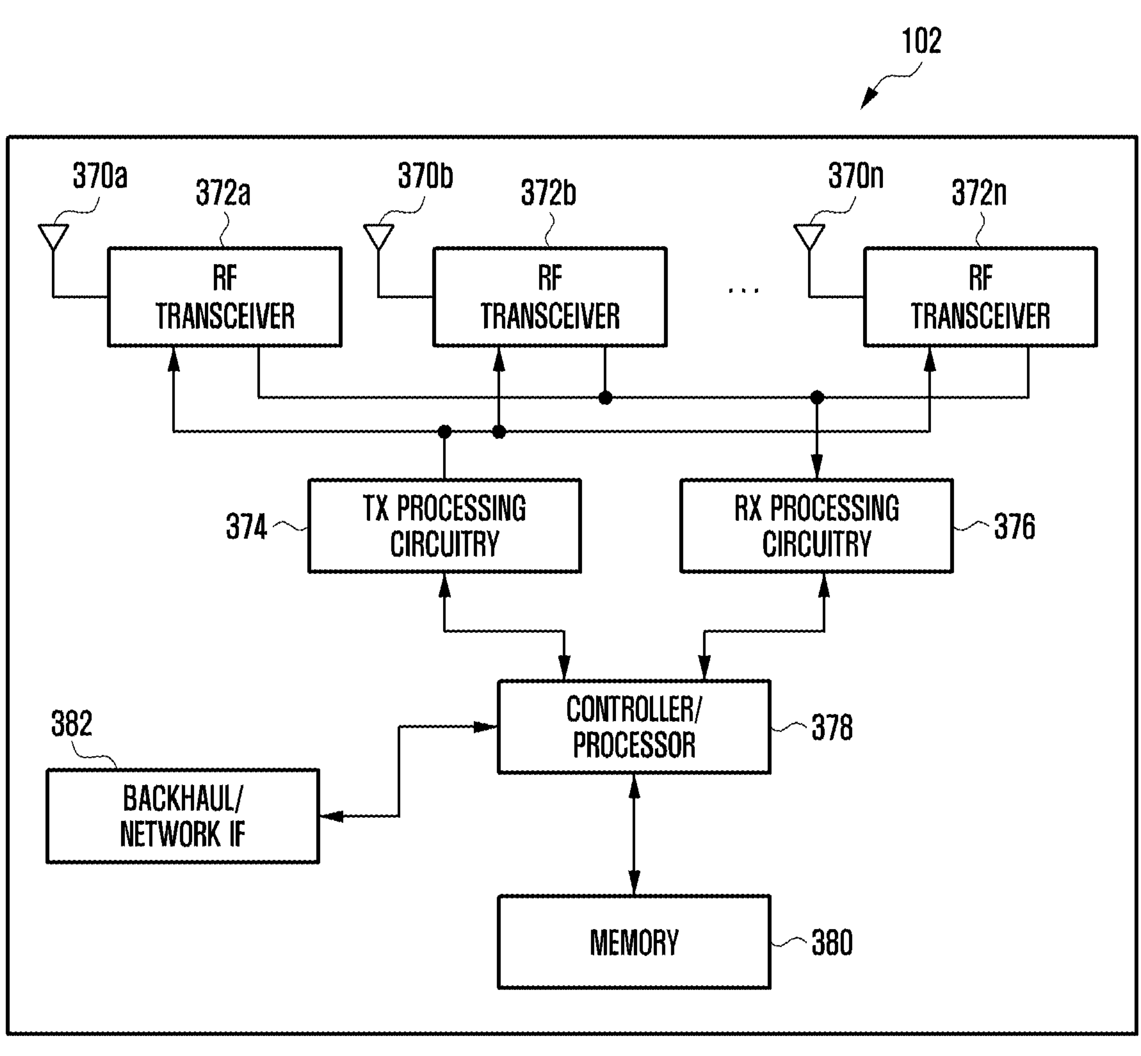
FIG. 3*b* is a schematic structure diagram of a base station according to an embodiment of the disclosure.

FIG. 3*b* illustrates an example gNB 102 according to the disclosure. The embodiment of gNB 102 shown in FIG. 3*b* is for illustration only, and other gNBs of FIG. 1 can have the same or similar configuration. However, a gNB has various configurations, and FIG. 3*b* does not limit the scope of the disclosure to any specific implementation of a gNB. It should be noted that gNB 101 and gNB 103 can include the same or similar structures as gNB 102.

As shown in FIG. 3*b*, gNB 102 includes a plurality of antennas 370*a*-370*n*, a plurality of RF transceivers 372*a*-372*n*, a transmission (TX) processing circuit 374, and a reception (RX) processing circuit 376. In certain embodiments, one or more of the plurality of antennas 370*a*-370*n* include a 2D antenna array. gNB 102 also includes a controller/processor 378, a memory 380, and a backhaul or network interface 382.

RF transceivers 372*a*-372*n* receive an incoming RF signal from antennas 370*a*-370*n*, such as a signal transmitted by UEs or other gNBs. RF transceivers 372*a*-372*n* down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372*a*-372*n* receive the outgoing processed baseband or IF signal from TX processing circuit 374 and up-convert the baseband or IF signal into an RF signal transmitted via antennas 370*a*-370*n*.

The controller/processor 378 can include one or more processors or other processing devices that control the overall operation of gNB 102. For example, the controller/processor 378 can control the reception of forward channel signals and the transmission of backward channel signals through the RF transceivers 372*a*-372*n*, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include a RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372*a*-372*n*, TX processing circuit 374 and/or RX processing circuit 376) support aggregated communication with FDD cells and TDD cells.

Although FIG. 3*b* illustrates an example of gNB 102, various changes may be made to FIG. 3*b*. For example, gNB 102 can include any number of each component shown in FIG. 3*a*. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

The transmission from the base station to the user equipment (UE) is called the downlink, and the transmission from the UE to the base station is called the uplink. The HARQ-ACK information of the Physical Downlink Shared Channel (PDSCH) may be transmitted in the Physical Uplink Shared Channel (PUSCH) or Physical Uplink Control Channel (PUCCH), the PDSCH is scheduled by the Downlink Control Information (DCI) transmitted by the Physical Downlink Control Channel (PDCCH).

Figure 4:
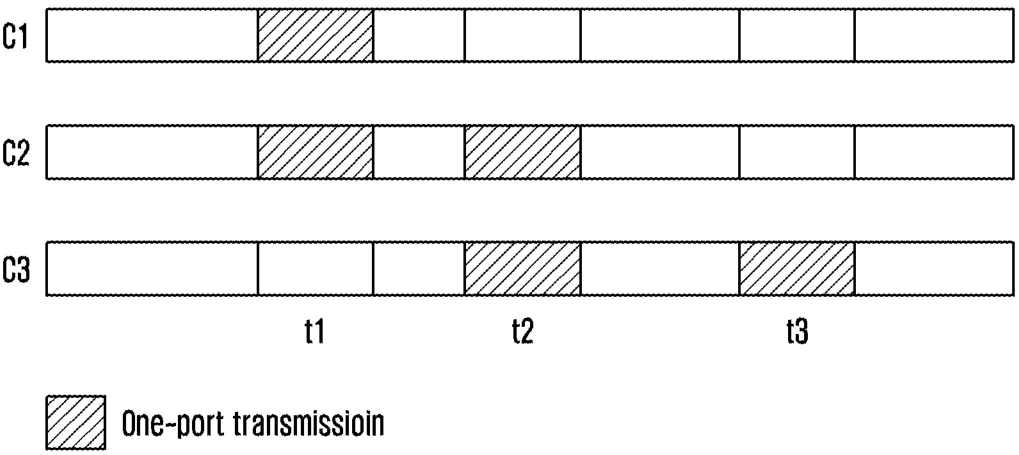
FIG. 4 is a first example diagram of uplink resource selection according to an embodiment of the disclosure.

The uplink transmitting capability of the UE is limited. For example, the UE may perform simultaneous transmission on at most N (N may be 2) uplink carriers in a one-port transmission mode, or the UE may perform simultaneous transmission on at most M (M may be 1) uplink carriers in a two-port transmission mode. There are L (L may be a positive integer, e.g., 2, 3, 4, etc.) uplink carriers configured for the UE by the base station, where the L may be greater than N and M. At this time, the UE may select at most N uplink carriers from the configured L uplink carriers in different time units and then simultaneously transmit uplink channels on the at most N uplink carriers in the one-port transmission mode. For example, L is equal to 3, the uplink carriers are C1, C2 and C3, respectively, and N is equal to 2. In a slot t1, the UE transmits an uplink channel on the uplink carriers C1 and C2 in the one-port transmission mode; in a slot t2, the UE transmits an uplink channel on the uplink carriers C2 and C3 in the one-port transmission mode; and, in a slot t3, the UE transmits an uplink channel on the uplink carrier C3 in the one-port transmission mode, as shown in FIG. 4.

Figure 5:
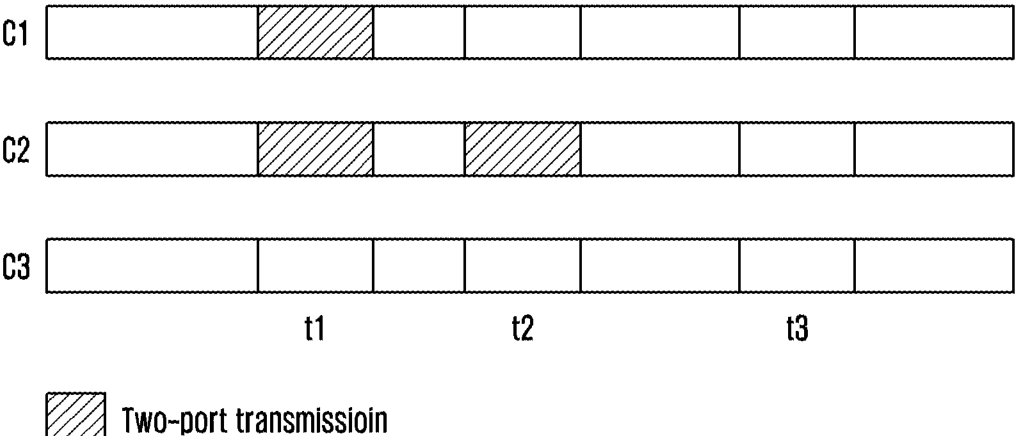
FIG. 5 is a second example diagram of uplink resource selection according to an embodiment of the disclosure.

Or, the UE may select at most M uplink carriers from the configured L uplink carriers in different time units and then simultaneously transmit uplink channels on the at most M uplink carriers in the two-port transmission mode. For example, L is equal to 3, the uplink carriers are C1, C2 and C3, respectively, and N is equal to 2. In a slot t1, the UE transmits an uplink channel on the uplink carrier C1 in the two-port transmission mode; and, in a slot t2, the UE transmits an uplink channel on the uplink carrier C2 in the two-port transmission mode, as shown in FIG. 5.

However, if the scheduled or configured uplink channels or reference signals in a slot (or a period of time) are simultaneously transmitted on Q (Q is greater than N) uplink carriers in a one-port transmission mode, but the UE may simultaneously transmit the uplink channels or reference signals on at most N (N may be 2) uplink carriers in the one-port transmission mode according to the capability of the UE, in this case, the UE needs to select N uplink carriers from the Q uplink carriers to transmit the uplink channels or reference signals, and cancel the transmission of the uplink channels or reference signals on Q-N uplink carriers. How to select N uplink carriers from Q uplink carriers and transmit uplink channels or reference signals on the N selected uplink carriers is a problem to be solved.

In view of the above technical problem or something to be improved, a communication method, a user equipment and a readable storage medium are provided in the disclosure. When the uplink channels or reference signals scheduled or configured by the base station are simultaneously transmitted on Q (greater than N) uplink carriers in the one-port transmission mode in a time unit, in order to meet the UE's capability, the UE needs to select N uplink carriers from the Q uplink carriers. Based on this, this solution provides relevant details on how to select N uplink carriers from Q uplink carriers and transmit uplink channels or reference signals on the selected N uplink carriers.

The communication method provided in the disclosure is used for transmitting uplink channels or uplink signals and control information, for example, transmitting physical uplink shared channel (PUSCH), physical uplink control channel (PUCCH), physical random access channel (PRACH), or uplink reference signal such as sounding reference signal (SRS).

Below, by describing several exemplary embodiments, the technical solutions of the embodiments of the disclosure and the technical effects produced by the technical solutions of the disclosure are illustrated. It should be noted that the following embodiments may refer to, learn from or combine with each other, and the same terms, similar features, and similar implementation steps in different embodiments will not be described repeatedly.

Figure 6:
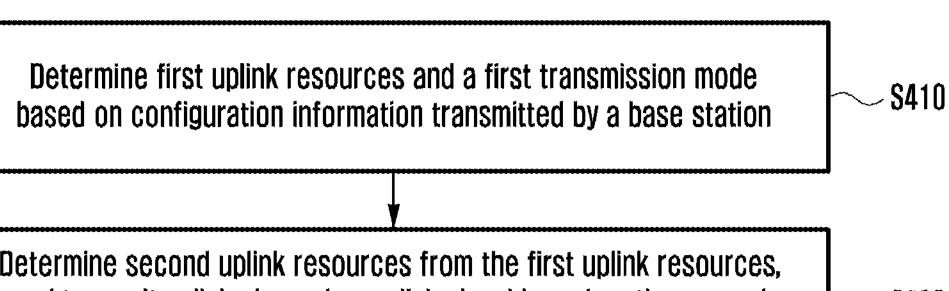
FIG. 6 is a flowchart of a method performed by a UE according to an embodiment of the disclosure.

FIG. 6 shows a flowchart of an example method 400 of a communication method according to an embodiment of the disclosure. The example method 400 of FIG. 6 may be implemented on a UE side. The method 400 is used for transmitting uplink channels and/or uplink reference signals. The uplink channels may include PUSCH, PUCCH or PRACH, and the uplink reference signals include SRS.

As shown in FIG. 6, the method 400 includes S410 and S420.

At S410, first uplink resources and a first transmission mode are determined based on configuration information transmitted by a base station.

At S420, second uplink resources are determined from the first uplink resources, and uplink channels or uplink signals are transmitted based on the second uplink resources and the first transmission mode.

Specifically, the UE may determine the first uplink resources and the first transmission mode based on the received configuration information, then determine the second uplink resources from the determined first uplink resources, and transmit the uplink channels or the uplink signals to the base station based on the second uplink sources and the determined first transmission mode.

The configuration information may include the number and indexes of uplink resources, and indication information, for example, downlink control information (DCI) or semi-static indication information. The indication information is used for indicating how many uplink resources (e.g., uplink carriers) on which the uplink channels or the uplink signals are transmitted simultaneously in a time unit (e.g., a slot, a period of time) in a one-port or a two-port transmission mode.

In the embodiment of the disclosure, the uplink resources may include uplink carriers, uplink serving cells or uplink bandwidth parts (BWPs). The transmission mode may be the one-port transmission or the two-port transmission.

The following description will be given by taking the uplink resources being uplink carriers as an example. The method applied to uplink carriers may also be applied to uplink serving cells or uplink BWPs as long as the uplink carriers are replaced with uplink serving cells or uplink BWPs. For the sake of brevity, the description will not be repeated here.

In some embodiments, the process of determining the second uplink resources from the first uplink resources at step 420 may specifically include:

in a time unit, based on the indexes of the first uplink resources and/or the priority index of the uplink channel or the uplink signal transmitted on each of the first uplink resources, selecting uplink resources from the first uplink resources to determine the second uplink resources.

That is, in a time unit (e.g., a slot), if the uplink channels or uplink signals scheduled (through the DCI) or configured (through the semi-static indication information) by the base station are simultaneously transmitted on Q uplink carriers (the above first uplink resources) in the one-port transmission mode (the above first transmission mode), and if Q is greater than N (N may be 2, i.e., the below first number), the UE may select, based on the indexes of the Q uplink carriers and/or the priority index of uplink channel or uplink signal transmitted on each of the uplink resources, uplink carriers from the Q uplink resources to determine at most N uplink carriers, and then transmit the uplink channels or uplink reference signals scheduled or configured by the base station on the determined at most N uplink carriers in the one-port transmission mode.

In this embodiment, which transmission mode in which the uplink channels or the uplink signals scheduled by the base station in a time unit are simultaneously transmitted on multiple uplink carriers may be dynamically indicated or configured semi-persistently, so that it is more flexible and convenient.

It should be understood that, if Q is less than or equal to N, the UE transmits the uplink channels or the uplink signals scheduled or configured by the base station on Q uplink carriers in the one-port transmission mode.

It should also be understood that, in the embodiments of the disclosure, if the first transmission mode is the one-port transmission mode, the first number may be 2; and, if the first transmission mode is the two-port transmission mode, the first number may be 1.

It is to be noted that, in this embodiment, the priority index is used to represent the priority of the service. For example, a service requiring high reliability and low delay is high in priority, and an ordinary service is low in priority. The priority index may be determined by the indication information carried in the DCI. For example, if a field in the DCI related to the priority index has a value of 1, it indicates that the uplink channel or uplink signal transmitted on the corresponding uplink resource is high in priority; and, if the field in the DCI related to the priority index has a value of 0, it indicates that the uplink channel or uplink signal transmitted on the corresponding uplink resource is low in priority. Or, the priority index may be determined by a high-layer signaling configuration.

Specifically, in this embodiment, the UE may select, based on the indexes of uplink carriers in the configuration information, at most N uplink carriers from Q uplink carriers among the configured uplink carriers in an order from the smallest to largest (or largest to smallest) indexes. The UE may transmit the uplink channels scheduled or configured by the base station on the selected at most N uplink carriers in the one-port transmission mode, and cancel the transmission of the uplink channels scheduled or configured by the base station on the unselected Q-N uplink carriers.

In this embodiment, it is simple and easy to implement the selecting, by the UE based on the indexes of uplink carriers, the uplink carriers for transmitting the uplink channels or the uplink reference signals.

Or, the UE may select, based on the priority indexes of uplink channels or uplink signals transmitted on the uplink carriers in the configuration information, the uplink carriers from Q uplink carriers among the configured uplink carriers in an order from the highest to lowest according to priorities of the uplink channels or the uplink signals transmitted on the uplink carriers.

If the number of uplink carriers selected in an order from the highest to lowest according to priorities of the uplink channels or the uplink signals transmitted on the uplink carriers is greater than N, at most N uplink carriers may be selected from the selected uplink carriers based on the indexes of uplink carriers and/or the priories of the uplink channels.

In one optional embodiment, the process of selecting the uplink resources may include:

selecting the uplink resources in an order from the highest to lowest according to priority index of the uplink channel or the uplink signal transmitted on each of the first uplink resources.

Specifically, in this embodiment, the UE may select the uplink carriers from the Q uplink carriers in an order from the highest to lowest according to priority index of the uplink channel or the uplink signal transmitted on each uplink carrier. If at most N uplink carriers are selected from the Q uplink carriers in an order from the highest to lowest according to priority indexes of the uplink channels or the uplink signals transmitted on the uplink carriers, the UE may transmit the uplink channel scheduled or configured by the base station on the selected at most N uplink carriers in the one-port transmission mode, and cancel the transmission of the uplink channel scheduled or configured by the base station on the unselected Q-N uplink carriers.

In another optional embodiment, the uplink resources are selected in an order from the highest to lowest according to priority index of the uplink channel or the uplink signal transmitted on each of the first uplink resources; and, if the number of the selected uplink resources is greater than the first number, the process of selecting the uplink resources may further include:

Selecting the uplink resources from the selected first uplink resources corresponding to the same priority index according to the indexes of the first uplink resources.

Specifically, in this embodiment, if more than N (e.g., H, which is greater than N) uplink carriers are selected from the Q uplink carriers in an order from the highest to lowest according to priority indexes of the uplink channels or the uplink signals transmitted on the uplink carriers, for the uplink carriers with the same priority index among the selected H uplink carriers, at most N uplink carriers are selected in an order from the smallest to largest (or largest to smallest) according to the indexes of uplink carriers.

In this embodiment, the timely transmission of channels with higher priority indexes may be ensured by selecting, by the UE based on the priority indexes of the uplink channels or the uplink signals transmitted on the uplink carriers, the uplink carriers for transmitting the uplink channels or the uplink reference signals.

In another optional embodiment, the uplink resources are selected in an order from the highest to lowest according to priority index of the uplink channel or the uplink signal transmitted on each of the first uplink resources; and, if the number of the selected uplink resources is greater than the first number, the process of selecting the uplink resources may further include:

selecting the uplink resources from the selected first uplink resources corresponding to the same priority index according to the priorities of the uplink channels or the uplink signals transmitted on the first uplink resources;

or, selecting the uplink resources from the selected uplink resources according to the indexes of the first uplink resources.

Specifically, in this embodiment, if more than N (e.g., H, which is greater than N) uplink carriers are selected from the Q uplink carriers in an order from the highest to lowest according to priority indexes of the uplink channels or the uplink signals transmitted on the uplink carriers, for the uplink carriers with the same priority index among the selected H uplink carriers, the uplink carriers are selected according to the priorities of the uplink channels or the uplink signals transmitted on the uplink carriers. Or, for the selected H uplink carriers, at most N uplink carriers are selected according to the indexes of uplink carriers.

If at most N uplink carriers are selected from the uplink carriers with the same priority index among the selected H uplink carriers according to the priorities of the uplink channels or the uplink signals transmitted on the uplink carriers, the UE may transmit the uplink channel scheduled or configured by the base station on the selected at most N uplink carriers in the one-port transmission mode, and cancel the transmission of the uplink channel scheduled or configured by the base station on the unselected Q-N uplink carriers.

In another optional embodiment, the uplink resources are selected from the selected first uplink resources corresponding to the same priority index according to the priorities of the uplink channels or the uplink signals transmitted on the first uplink resources; and, if the number of the selected uplink resources is greater than the first number, the process of selecting the uplink resources may further include:

selecting the uplink resources from the selected first uplink resources corresponding to the same priority according to the indexes of the first uplink resources.

If more than N (e.g., G, which is greater than N) uplink carriers are selected from the uplink carriers with the same priority index among the selected H uplink carriers according to the priorities of the uplink channels or the uplink signals transmitted on the uplink carriers, for the uplink carriers with the same priority among the selected G uplink carriers, at most N uplink carriers are selected in an order from the smallest to largest (or largest to smallest) according to indexes of uplink carriers.

In the above embodiment, by selecting, by the UE based on the indexes of uplink carriers and the priority indexes of the uplink channels or the uplink signals transmitted on the uplink carriers, uplink carriers for transmitting the uplink channels or the uplink reference signals, the timely transmission of channels with larger priority indexes may be ensured, and the uplink channels with smaller priority indexes may be transmitted as far as possible under the premise of satisfying the transmission of uplink channels with higher priority indexes.

It is to be noted that, the UE may simultaneously transmit the uplink channels or the uplink reference signals scheduled or configured by the base station on the selected uplink carriers in the first transmission mode, and cancel the transmission of the uplink channels or the uplink reference signals scheduled or configured by the base station on the unselected uplink carriers. That is, the uplink channels or the uplink reference signals scheduled or configured by the base station are not transmitted on the unselected uplink carriers.

It is also to be noted that, in this embodiment, different uplink channels with the same priority index have different priorities. For example, the priorities of the uplink channels and the uplink reference signal may be ranked from high to low: PUCCH or PUSCH for transmitting HARO-ACK (hybrid automatic repeat request acknowledgement), PUCCH or PUSCH for transmitting channel state information (CSI), PUCCH or PUSCH that does not transmit HARQ-ACK or CSI, and SRS signal.

The communication method provided in the embodiments of the disclosure will be described below in detail with reference to FIGS. 7-10 by taking the one-port transmission mode as an example. It should be understood that the communication method provided in the embodiments of the disclosure may be applied in a situation where the scheduled or configured uplink channels or reference signals are simultaneously transmitted on more than M uplink carriers in the two-port transmission mode.

EMBODIMENT 1

When the configuration information is received by the UE from the base station, the base station configures L uplink carriers for the UE, and there are uplink channels or reference signals to be simultaneously transmitted on all of the L uplink carriers. The UE may select at most N uplink carriers from the configured L uplink carriers, to simultaneously transmit multiple uplink channels or multiple uplink signals on the at most N uplink carriers in the one-port transmission mode. The simultaneous transmission of the multiple uplink channels or the multiple reference signals means that the transmissions of the multiple uplink channels or the multiple reference signals are overlapped in at least one time unit.

Example 1.1

A method for simultaneously transmitting uplink channels or reference signals on at most N uplink carriers selected from the configured L uplink carriers in the one-port transmission mode includes: selecting base on the index of each of the L uplink carriers configured for the UE by the base station.

In a slot, if the scheduled or configured uplink channels or reference signals are simultaneously transmitted on Q (Q is less than or equal to N) uplink carriers in the one-port transmission mode, the UE transmits the scheduled or configured uplink channels or reference signals on the Q uplink carriers in the one-port transmission mode.

If the scheduled or configured uplink channels or reference signals are simultaneously transmitted on Q (Q is greater than N) uplink carriers in the one-port transmission mode, the UE selects N uplink carriers from the Q uplink carriers in an order from the smallest to largest (or largest to smallest) according to indexes of uplink carriers to transmit the scheduled or configured uplink channels or reference signals in the one-port transmission mode, and cancels the transmission of the scheduled or configured uplink channels or reference signals on the remaining Q-N uplink carriers.

Figure 7:
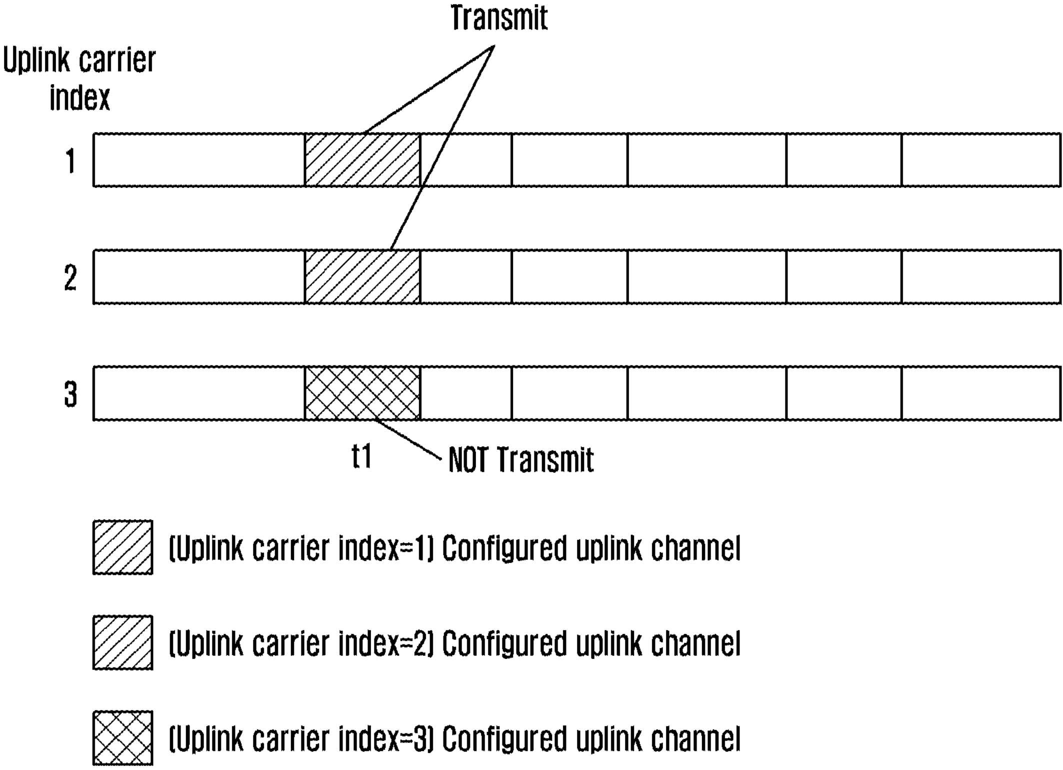
FIG. 7 is a third example diagram of uplink resource selection according to an embodiment of the disclosure.

For example, the base station configures three uplink carriers for the UE, the indexes of the uplink carriers are 1, 2 and 3, respectively, and N is equal to 2. In a slot t1, the UE configures that uplink channels are transmitted in the one-port transmission mode on the three uplink carriers with uplink carrier indexes of 1, 2 and 3, selects, in an order from largest to smallest according to the indexes of uplink carriers, the uplink carriers with uplink carrier indexes of 1 and 2 to transmit the configured uplink channels in the one-port transmission mode, and does not transmit the configured uplink channels on the uplink carrier with the index of 3, as shown in FIG. 7. Advantageously, this method is easy to implement.

Example 1.2

Another method for simultaneously transmitting uplink channels or reference signals on at most N uplink carriers selected from the configured L uplink carriers in the one-port transmission mode includes: selecting uplink carriers to transmit the uplink channels or the reference signals in an order from highest to lowest according to priority index of the uplink channel or reference signal transmitted on each of the uplink carriers.

The priority indexes are determined according to the reliability and delay requirements of the data and control information of channel transmission. For example, PUSCH with a priority index of "1" is a channel for transmitting URLLC data and is high in priority; PUSCH with a priority index of "0" is a channel for transmitting eMBB data and is low in priority. Generally, the reference signal is considered as having small priority indexes. For example, SRS has a priority index of "0".

If the number of the uplink carriers for transmitting the uplink channels or the reference signals selected in an order from highest to lowest according to the priority index of the uplink channel or the reference signal transmitted on each of the uplink carriers is less than or equal to N, the uplink channels or the reference signals are transmitted on the selected uplink carriers, and the transmissions of the uplink channels or the reference signals are cancelled on the unselected uplink carriers.

Figure 8:
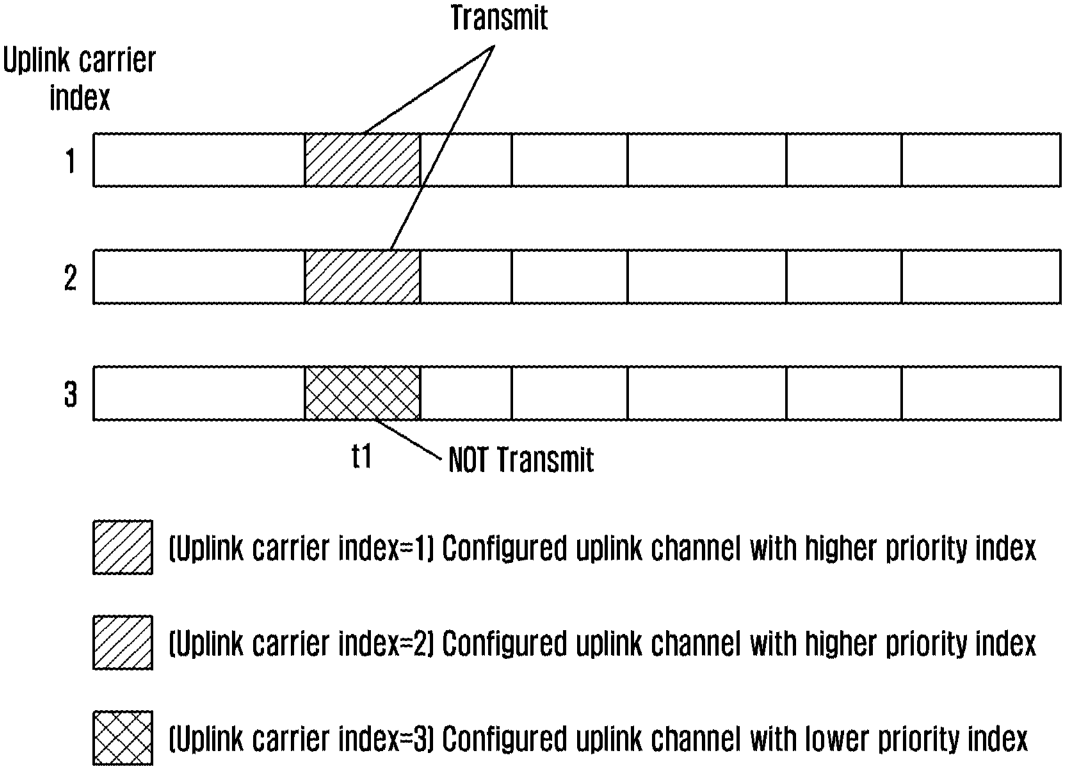
FIG. 8 is a fourth example diagram of uplink resource selection according to an embodiment of the disclosure.

For example, in a slot, the base station configures three uplink carriers for the UE, the indexes of uplink carriers are 1, 2 and 3, respectively, and N is equal to 2. In a slot t1, the UE configures that uplink channels with higher priority indexes need to be transmitted on the uplink carriers with the uplink carrier indexes of 1 and 2, and configures that uplink channels with lower priority indexes need to be transmitted on the uplink carrier with the uplink carrier index of 3, and selects, in an order from highest to lowest according to priority indexes of the uplink channels transmitted on the uplink carriers, two uplink carriers to transmit the uplink channels or the reference signals. That is, the uplink channels are transmitted on the uplink carriers with uplink carrier indexes of 1 and 2 for the uplink channels with higher priority indexes, and the transmissions of the uplink channels are cancelled on the unselected uplink carrier with the uplink carrier index of 3 for the uplink channels with lower priority indexes, as shown in FIG. 8.

Example 1.3

Yet another method for simultaneously transmitting uplink channels or reference signals on at most N uplink carriers selected from the configured L uplink carriers in the one-port transmission mode includes: selecting N uplink carriers to transmit the uplink channels or the reference signals in an order from highest to lowest according to priority index of the uplink channel or the reference signal transmitted on each of the uplink carriers.

If the number H of uplink carriers selected in an order from highest to lowest according to priority index of the uplink channel or the reference signal transmitted on each of the uplink carriers is still greater than N, a selecting is performed on the selected uplink carriers corresponding to the same priority index according to the indexes of uplink carriers, so that the number of the selected uplink carriers is less than or equal to N.

If the number S of the uplink carriers for transmitting uplink channels or reference signals selected in an order from highest to lowest according to priority index of the uplink channel or the reference signal transmitted on each of the uplink carriers is greater than N, at most N uplink carriers are selected from the selected S uplink carriers in an order from lowest to highest (or highest to lowest) according to indexes of uplink carriers to transmit uplink channels or reference signals.

In a slot, if the scheduled or configured uplink channels or reference signals are simultaneously transmitted on Q (Q is less than or equal to N) uplink carriers in the one-port transmission mode, the UE transmits the scheduled or configured uplink channels or reference signals on the Q uplink carriers in the one-port transmission mode.

Figure 9:
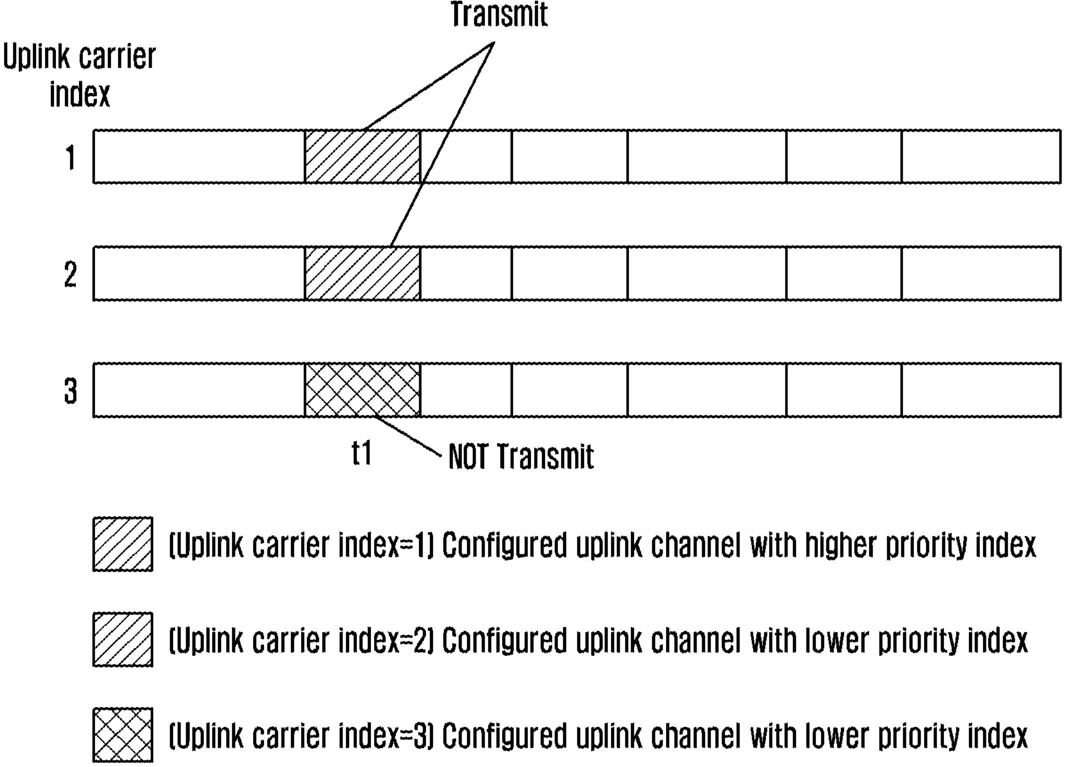
FIG. 9 is a fifth example diagram of uplink resource selection according to an embodiment of the disclosure.

For example, the base station configures three uplink carriers for the UE, the indexes of the uplink carriers are 1, 2 and 3, respectively, and N is equal to 2. In a slot t1, the UE configures that uplink channels with higher priority indexes need to be transmitted on the uplink carrier with the uplink carrier index of 1, and configures that uplink channels with lower priority indexes need to be transmitted on the uplink carriers with the uplink carrier indexes of 2 and 3. The uplink carrier with the uplink carrier index of 1 is selected to transmit the uplink channels or the reference signals in an order from the highest to lowest according to priority indexes of the uplink channels on the uplink carriers. For the uplink carrier with the uplink carrier index indexes of 2 and 3 corresponding to the same priority index, one uplink carrier is selected in an order from smallest to largest according to the indexes of the uplink carriers to transmit the uplink channels or the reference signals, and the transmission of the uplink channels on the uplink carrier with the uplink carrier index of 3 is cancelled, as shown in FIG. 9.

Advantageously, by using this method, the timely transmission of channels with higher priority indexes may be ensured, and the uplink channels with lower priority indexes may be transmitted as far as possible under the premise of satisfying the transmission of uplink channels with higher priority indexes.

Example 1.4

Yet another method for simultaneously transmitting uplink channels or reference signals on at most N uplink carriers selected from the configured L uplink carriers in the one-port transmission mode includes: selecting N uplink carriers to transmit the uplink channels or the reference signals in an order from highest to lowest according to priority index of the uplink channel or the reference signal transmitted on each of the uplink carriers.

If the number H of uplink carriers selected to transmit uplink channels or reference signals in an order from highest to lowest according to priority index of the uplink channel or the reference signal transmitted on each of the uplink carriers is still greater than N, a selecting is performed on the selected uplink carriers corresponding to the same priority index according to the priorities of the uplink channels transmitted on the uplink carriers.

If the number G of uplink carriers selected to transmit uplink channels or reference signals in an order from highest to lowest according to the priorities of the uplink channels transmitted on the uplink carriers is still greater than N, a selecting is performed on the selected uplink carriers corresponding to the uplink channels with the same priority according to the indexes of the uplink carriers, so that the number of the selected uplink carriers is less than or equal to N.

Figure 10:
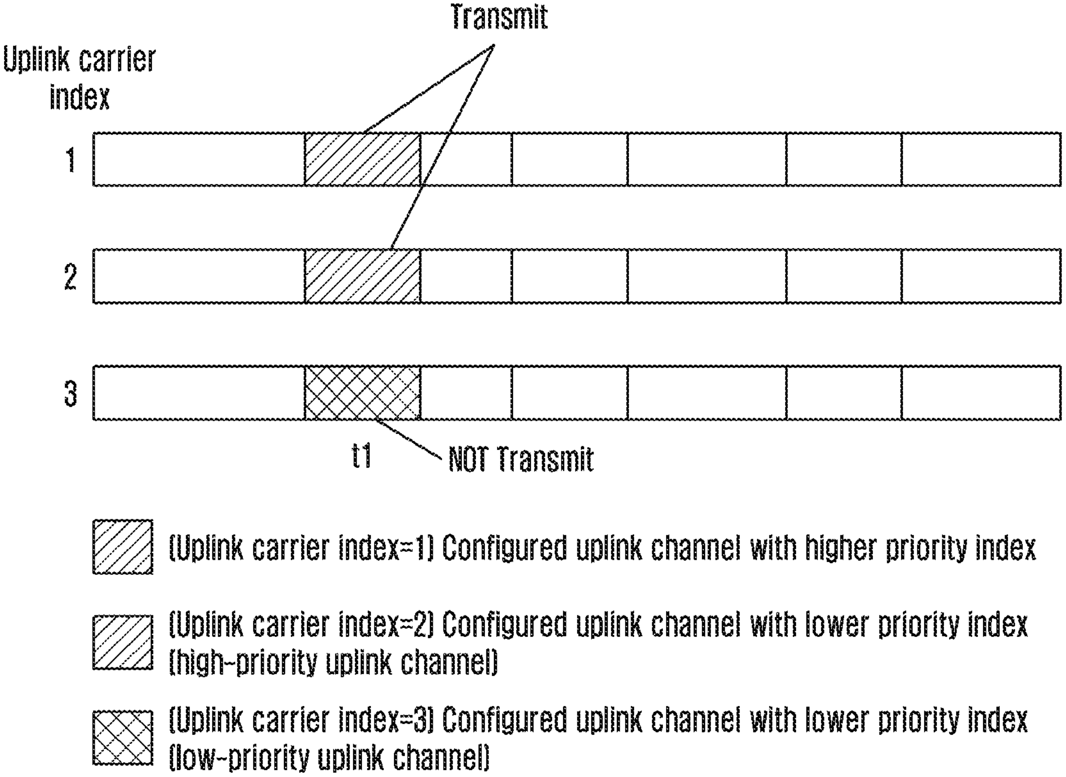
FIG. 10 is a sixth example diagram of uplink resource selection according to an embodiment of the disclosure.

For example, the base station configures three uplink carriers for the UE, the indexes of the uplink carriers are 1, 2 and 3, respectively, and N is equal to 2. In a slot t1, the UE configures that uplink channels with higher priority indexes need to be transmitted on the uplink carrier with the uplink carrier index of 1, and configures that uplink channels with lower priority indexes need to be transmitted on the uplink carriers with the uplink carrier indexes of 2 and 3. The uplink carrier with the uplink carrier index of 1 is selected to transmit the uplink channels or the reference signals in an order from highest to lowest according to priority indexes of the uplink channels on the uplink carriers. For the uplink carrier with the uplink carrier index indexes of 2 and 3 corresponding to the same priority index, the priority of the uplink channel on the uplink carrier with the uplink carrier index of 2 is higher than that of the uplink channel on the uplink carrier with the uplink carrier index of 3. The UE transmits the uplink channels on the uplink carriers with the uplink carrier indexes of 1 and 2, and cancels the transmission of uplink channels on the uplink carrier with the uplink carrier index of 3, as shown in FIG. 10.

Advantageously, by using this method, the timely transmission of channels with higher priority indexes may be ensured, and the uplink channels with lower priority indexes may be transmitted as far as possible under the premise of satisfying the transmission of channels with higher priority indexes and uplink channels with higher priorities.

In the above embodiment, it is directed to the method for determining uplink carriers in a case that the transmission of the uplink channel or the uplink reference signal on each uplink carrier satisfies the timing requirements. Satisfying the timing requirements means that the scheduled uplink channel has enough preparation time to be transmitted on the selected uplink carrier.

An embodiment of the disclosure provides a user equipment. The user equipment may include: a determination module and a transmitting module, wherein, the determination module is configured to determine first uplink resources and a first transmission mode based on configuration information transmitted by a base station, and determine second uplink resources from the first uplink resources; and the transmitting module is configured to transmit uplink channels or uplink signals based on the second uplink resources and the first transmission module determined by the determination module.

In some optional embodiments, when determining the second uplink resources from the first uplink resources, the determination module is specifically configured to: in a time unit, based on the indexes of the first uplink resources and/or the priority index of the uplink channel or the uplink signal transmitted on each of the first uplink resources, select uplink resources from the first uplink resources to determine the second uplink resources.

In other optional embodiments, when selecting the uplink resources, the determination module is specifically configured to: select the uplink resources in an order from highest to lowest according to priority index of the uplink channel or the uplink signal transmitted on each of the first uplink resources.

In other embodiments, if the number of the selected uplink resources is greater than the first number, when selecting the uplink resources, the determination module is further configured to: select the uplink resources from the selected first uplink resources corresponding to the same priority index according to the priorities of the uplink channels or the uplink signals transmitted on the first uplink resources.

In other embodiments, if the number of the selected uplink resources is greater than the first number, when selecting the uplink resources, the determination module is further configured to: select the uplink resources from the selected first uplink resources corresponding to the same priority according to the indexes of the first uplink resources.

In other embodiments, if the number of the selected uplink resources is greater than the first number, when selecting the uplink resources, the determination module is further configured to: select the uplink resources from the selected uplink resources according to the indexes of the first uplink resources; or, select the uplink resources from the selected first uplink resources corresponding to the same priority index according to the indexes of the first uplink resources.

In other optional embodiments, the determination module is further configured to: cancel the transmission of uplink channel or uplink signal on the unselected uplink resource.

In the above embodiment, the first transmission mode is the one-port transmission mode or the two-port transmission mode.

Figure 11:
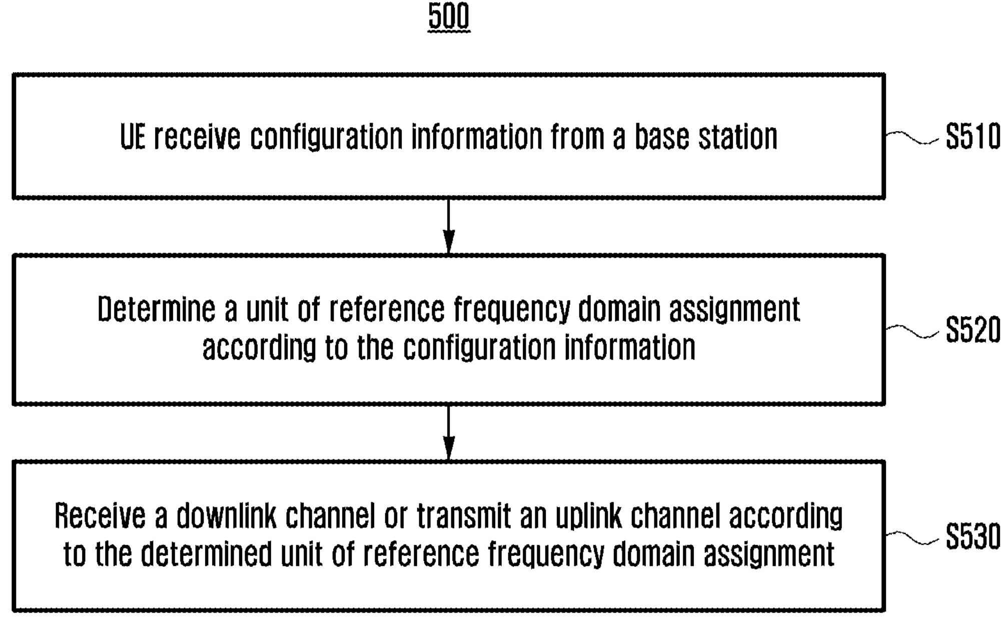
FIG. 11 is a flowchart of a method performed by a UE according to another embodiment of the disclosure.

FIG. 11 is a flowchart of a method performed by a user equipment (UE) in a communication system according to an embodiment of the disclosure.

As shown in FIG. 11, at S510, configuration information is received from a base station. The base station may transmit the configuration information to the UE through a signaling (e.g., a high-layer signaling).

The configuration information may include a configuration of a bandwidth part (BWP) of at least one serving cell, and may include the number of BWPs and the subcarrier spacing (SCS) configuration of each BWP. The subcarrier spacing may also be referred to as subcarrier interval. The physical downlink control channel (PDSCH) and/or the physical uplink control channel (PUSCH) of the at least one serving cell is simultaneously scheduled by a DCI format.

The configuration information may further include the number of the at least one serving cell, and the DCI format information of the DCI format used for simultaneously scheduling the PDSCH and/or PUSCH of the at least one serving cell.

The number of the at least one serving cell may be depended on the number of serving cells configured for the UE. For example, the number of the serving cells in which the PDSCHs are scheduled by the DCI format may be the configured maximum number of the serving cells. For example, when the configured maximum number of the serving cells in which the PDSCHs are scheduled by the DCI format is 4, the DCI format may schedule 1, 2, 3 or 4 serving cells. The above example is only illustrative, and the disclosure is not limited thereto.

The configuration information may further include a search space identifier of the search space in the BWP of the scheduling serving cell and a search space identifier of the search space in the BWP of the scheduled serving cell, which are used to determine whether the search space in the BWP of the scheduling serving cell is linked with the search space in the BWP of the scheduled serving cell.

The search space of the BWP of the scheduling serving cell and the search space of the BWP of the scheduled serving cell that have the same search space identifier are linked.

At S520, a unit of reference frequency domain resource assignment is determined according to the configuration information.

Specifically, the unit of reference frequency domain resource assignment is determined based on the subcarrier spacing configuration of the BWP of the scheduling serving cell or the subcarrier spacing configuration of the BWP of the first scheduled serving cell, wherein the search space of the BWP of the first scheduled serving cell is linked with the search space of the BWP of the scheduling serving cell.

In other words, the unit of reference frequency domain assignment may be determined based on the subcarrier spacing configuration of the active BWP of the scheduling serving cell, or the unit of reference frequency domain assignment may be determined based on the subcarrier spacing configuration of the BWP of one scheduled serving cell having a search space that is linked with the search space of the BWP of the scheduling serving cell.

The downlink corresponds to downlink transmission (also referred to as downlink transmitting, uplink transmit, etc.), and the downlink transmission includes at least one of transmission of downlink channel and transmission of downlink signal, wherein the downlink channel includes physical downlink shared channel (PDSCH) or physical downlink control channel (PDCCH), and the uplink signal may include, but not limited to, downlink reference signal. PDSCH is scheduled by the downlink control information in PDCCH.

The uplink transmission includes at least one of transmission of uplink channel and transmission of uplink signal, wherein the uplink channel includes physical uplink shared channel (PUSCH), physical uplink control channel (PUCCH) and physical random access channel (PRACH), and the uplink signal may include, but not limited to, uplink reference signal. PUSCH is scheduled by the downlink control information in PDCCH.

The PDSCH/PUSCH may be scheduled by a PDCCH that is located in the same serving cell as the PDSCH/PUSCH (the serving cell may also be referred to as a component carrier (CC)), which is called self-carrier-scheduling; or, the PDSCH/PUSCH may be scheduled by a PDCCH that is not located in the same serving cell as the PDSCH/PUSCH, which is called cross-carrier-scheduling. The cell that transmits the PDCCH is called a scheduling serving cell, while the cell that transmits the PDSCH/PUSCH is called a scheduled serving cell. For self-carrier-scheduling, the scheduling serving cell and the scheduled serving cell are the same; while for the cross-carrier-scheduling, the scheduling serving cell and the scheduled serving cell are different.

For the cross-carrier-scheduling, a search space identifier (searchSpaceId=a) of a search space is configured in the downlink bandwidth part (BWP) of the scheduling serving cell, and a search space identifier (searchSpaceId=a) of a search space is configured in the downlink BWP of the scheduled serving cell. If the search space with the search space identifier searchSpaceId=a configured in the downlink BWP of the scheduling serving cell and the search space with the search space identifier searchSpaceId=a configured in the downlink BWP of the scheduled serving cell are linked search spaces, the PDCCH in the search space a of the downlink BWP of the scheduling serving cell performs cross-carrier-scheduling on the PDSCH/PUSCH of the downlink BWP of the scheduled serving cell.

When the UE is configured with one DCI to simultaneously schedule the PDSCH/PUSCH of at least one serving cell (for example, one DCI may simultaneously schedule PDSCHs/PUSCHs of M serving cells, where M is a positive integer), in order to reduce the implementation complexity of the UE, the subcarrier spacing configuration of the BWP of the at least one serving cell simultaneously scheduled by one DCI should be the same. However, the scheduled serving cell may be configured with more than one BWP, and the subcarrier spacing configurations of different BWPs are different. Therefore, it is necessary to determine the subcarrier spacing configuration of one reference BWP as the unit of reference frequency domain resource assignment (FDRA). In other words, it is necessary to select the subcarrier spacing configuration of one BWP and then schedule the PDSCH and/or PUSCH on the basis of the physical resource block (PRB) determined based on the subcarrier spacing configuration of this BWP.

For example, if the subcarrier spacing configuration of the BWP is 0, the corresponding subcarrier spacing size is 15 KHz; and, if the subcarrier spacing configuration of the BWP is 1, the corresponding subcarrier spacing size is 30 KHz. It is assumed that the scheduling serving cell has 2 BWPs, wherein the subcarrier spacing configuration of BWP11 is 0, and the corresponding subcarrier spacing size is 15 KHz; the subcarrier spacing configuration of BWP12 is 1, and the corresponding subcarrier spacing size is 30 KHz; and BWP11 is an active BWP. It is assumed that the scheduled serving cell has 2 BWPs, wherein the subcarrier spacing configuration of BWP21 is 0, and the corresponding subcarrier spacing size is 15 KHz; the subcarrier spacing configuration of BWP22 is 1, and the corresponding subcarrier spacing size is 30 KHz; and, the search space of BWP22 of the scheduled serving cell is linked with the search space of BWP11 of the scheduling serving cell.

If the unit of reference frequency domain resource assignment is determined based on the subcarrier spacing configuration of BWP11 of the scheduling serving cell, the unit of reference frequency domain resource assignment is 12*15 KHz, where 12 is the number of subcarriers of one PRB.

If the unit of reference frequency domain resource assignment is determined based on the subcarrier spacing configuration of BWP22 of one scheduled serving cell having a search space that is linked with the search space of BWP11 of the scheduling serving cell, the unit of reference frequency domain resource assignment is 12*30 KHz, where 12 is the number of subcarriers of one PRB.

When the UE is configured with one DCI to simultaneously schedule the PDSCH/PUSCH of at least one serving cell (for example, one DCI may simultaneously schedule the PDSCHs/PUSCHs of M serving cells, where M is a positive integer) and the scheduled serving cells do not include the scheduling serving cell, the searchSpaceId=b of the search space of BWP-1 of one scheduled serving cell c1 (corresponding to the first scheduled serving cell described hereinafter) in the scheduled serving cells and the searchSpaceId=b of the search space of BWP-2 of the scheduling serving cell c2 are configured to be linked search space b. The scheduled serving cell c1 is called a reference scheduled serving cell, and the unit of reference frequency domain resource assignment is determined based on the subcarrier spacing configuration of BWP-1 of the scheduled serving cell c1. The BWP-2 of the scheduling serving cell c2 is an active BWP. The advantage of this method is that the unit of reference frequency domain resource assignment may be determined without additional signaling, so that it is convenient for the UE to receive PDCCs and PDSCH/PUSCH.

When the UE is configured with one DCI to simultaneously schedule the PDSCH/PUSCH of at least one serving cell (for example, one DCI may simultaneously schedule PDSCHs/PUSCHs of M serving cells, where M is a positive integer) and the scheduled serving cells include the scheduling serving cell, the scheduling serving cell c2 is called a reference scheduled serving cell, and the unit of reference frequency domain resource assignment is determined based on the subcarrier spacing configuration of BWP-2 of the scheduling serving cell c2. The BWP-2 of the scheduling serving cell c2 is an active BWP. The advantage of this method is that the unit of reference frequency domain resource assignment may be determined without additional signaling, so that it is convenient for the UE to receive PDCCH and PDSCH/PUSCH.

When the UE is configured with one DCI to simultaneously schedule the PDSCH/PUSCH of at least one serving cell (for example, one DCI may simultaneously schedule the PDSCHs/PUSCHs of M serving cells, where M is a positive integer) and the scheduled serving cells include the scheduling serving cell, the searchSpaceId=b of the search space of BWP-1 of one scheduled serving cell cl in the scheduled serving cells and the searchSpaceId=b of the search space of BWP-2 of the scheduling serving cell c2 are configured to be linked search space b. The scheduled serving cell cl is called a reference scheduled serving cell, and the unit of reference frequency domain resource assignment is determined based on the subcarrier spacing configuration of BWP-1 of the scheduled serving cell c1. The BWP-2 of the scheduling serving cell c2 is an active BWP. The advantage of this method is that the unit of reference frequency domain resource assignment may be determined without additional signaling, so that it is convenient for the UE to receive PDCCH and PDSCH/PUSCH.

At S530, PDCCH and PDSCH/PUSCH are received according to the determined unit of reference frequency domain resource assignment.

It is to be noted that the base station may also determine the unit of reference frequency domain resource assignment according to the subcarrier spacing configuration of the BWP of the scheduling serving cell or the subcarrier spacing configuration of the BWP of the first scheduled serving cell, wherein the search space of the BWP of the first scheduled serving cell is linked with the search space of the BWP of the scheduling serving cell. The specific implementation process of determining the unit of reference frequency domain resource assignment may refer to the implementation on the UE side, and will not be repeated here for conciseness of description.

The user equipment in the embodiment of the disclosure may perform the method provided in the embodiment of the disclosure, and its implementation principle is similar. The actions performed by the modules in the user equipment in the various embodiments of the disclosure correspond to the steps in the methods of the various embodiments of the disclosure. For the detailed functional description and beneficial effects of each module of the user equipment, please refer to the description in the corresponding methods shown above, and will not be repeated here.

An electronic device is provided in an embodiment of the disclosure, comprising: a transceiver configured to transmit and receive signals; and a processor coupled with the transceiver and configured to control to implement the steps of the methods in the above various embodiments. Optionally, the electronic device may be a UE, and the processor in the electronic device is configured to control to implement the steps of the methods performed by the UE provided in methods of the above various embodiments.

Figure 12:
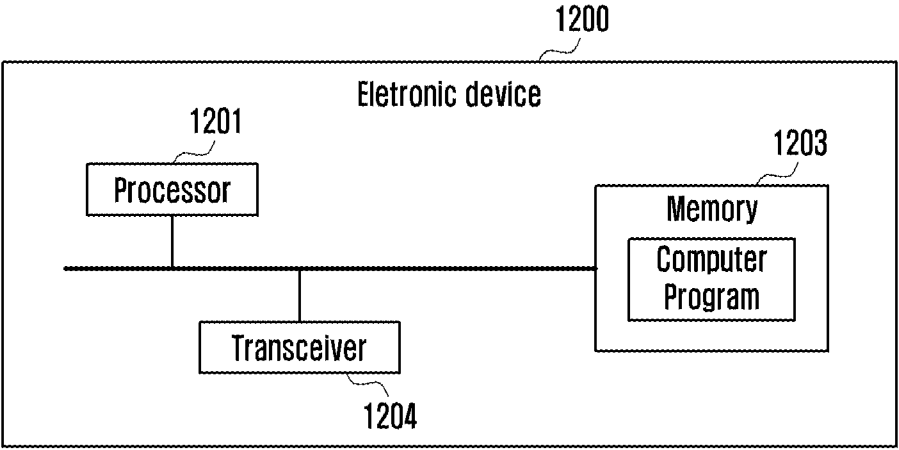
FIG. 12 is a schematic structure diagram of an electronic device according to an embodiment of the disclosure.

In an optional embodiment, there is provided an electronic device as shown in FIG. 12. The electronic device 1200 shown in FIG. 12 may include a processor 1201 and a memory 1203. The processor 1201 is connected to the memory 1203, for example, through a bus 1202. Optionally, the electronic device 1200 may further include a transceiver 1204 configured to data interaction between the electronic device and other electronic devices, such as sending and/or receiving data. It should be noted that, in practical applications, the transceiver 1204 is not limited to one, and the structure of the electronic device 1200 does not constitute any limitations to the embodiments of the disclosure.

The processor 1201 may be a central processing unit (CPU), a general-purpose processor, a digital signal processor (DSP), an application specific integrated circuit (ASIC), or a field programmable gate array (FPGA), or other programmable logic devices, transistor logic devices, hardware components, or any combination thereof. It may implement or execute various exemplary logical blocks, modules and circuits described in connection with the disclosure. The processor 1201 may also be a combination for realizing computing functions, for example, a combination of one or more microprocessors, a combination of a DSP and a microprocessor, etc.

The bus 1202 may include a path to transfer information between the components described above. The bus 1202 may be a peripheral component interconnect (PCI) bus, or an extended industry standard architecture (EISA) bus, etc. The bus 1202 may be an address bus, a data bus, a control bus, etc. For ease of presentation, the bus is rep-resented by only one thick line in FIG. 12. However, it does not mean that there is only one bus or one type of buses.

The memory 1203 may be, but not limited to, read only memories (ROMs) or other types of static storage devices that can store static information and instructions, random access memories (RAMs) or other types of dynamic storage devices that can store information and instructions, may be electrically erasable programmable read only memories (EEPROMs), compact disc read only memories (CD-ROMs) or other optical disk storages, optical disc storages (including compact discs, laser discs, discs, digital versatile discs, blue-ray discs, etc.), magnetic storage media or other magnetic storage devices, or any other media that can carry or store desired program codes in the form of instructions or data structures and that can be accessed by computers.

The memory 1203 is used to store application program codes for executing the solutions of the disclosure, and is controlled by the processor 1201. The processor 1201 is used to execute the application program codes stored in the memory 1203 to implement the solution provided in any method embodiment described above.

Embodiments of the disclosure provide a computer-readable storage medium having a computer program stored on the computer-readable storage medium, the computer program, when executed by a processor, implements the steps and corresponding contents of the foregoing method embodiments.

Embodiments of the disclosure also provide a computer program product including a computer program, the computer program when executed by a processor realizing the steps and corresponding contents of the preceding method embodiments.

The terms “first”, “second”, “third”, “fourth”, “1”, “2”, etc. (if present) in the specification and claims of this application and the accompanying drawings above are used to distinguish similar objects and need not be used to describe a particular order or sequence or magnitude. It should be understood that the data so used is interchangeable where appropriate so that embodiments of the disclosure described herein can be implemented in an order other than that illustrated or described in the text.

It should be understood that while the flow diagrams of embodiments of the disclosure indicate the individual operational steps by arrows, the order in which these steps are performed is not limited to the order indicated by the arrows. Unless explicitly stated herein, in some implementation scenarios of embodiments of the disclosure, the implementation steps in the respective flowcharts may be performed in other orders as desired. In addition, some, or all of the steps in each flowchart may include multiple sub-steps or multiple phases based on the actual implementation scenario. Some or all of these sub-steps or stages can be executed at the same moment, and each of these sub-steps or stages can also be executed at different moments separately. The order of execution of these sub-steps or stages can be flexibly configured according to requirements in different scenarios of execution time, and the embodiments of the disclosure are not limited thereto.

The above descriptions are only preferred embodiments of the disclosure, and are not intended to limit the disclosure. Any modifications, equivalent replacements, improvements, etc. made within the spirit and principles of the disclosure shall be included in the scope of protection of the disclosure.

While the disclosure has been shown and described with reference to the various example embodiments thereof, it will be understood that various changes in form and detail may be made therein without departing from the spirit and scope defined in the following claims and equivalent thereof.

The invention claimed is:

1. A method performed by a user equipment (UE) in a communication system, the method comprising:

receiving, from a base station, configuration information, wherein the configuration information comprises a bandwidth part (BWP) configuration of at least one serving cell, and a subcarrier spacing configuration for each BWP:

receiving, from the base station. downlink control information (DCI) for scheduling at least one of a physical downlink shared channel (PDSCH) or a physical uplink shared channel (PUSCH) of serving cells;

identifying a first scheduled serving cell among the serving cells:

identifying a reference frequency domain resource assignment based on a subcarrier spacing configuration of a BWP of the first scheduled serving cell, wherein a search space of the BWP of the first scheduled serving cell is linked with a search space of a BWP of a scheduling serving cell on which the DCI is transmitted; and performing PDSCH reception or PUSCH transmission based on the reference frequency domain resource assignment.

2. The method of claim 1, wherein the configuration information further comprises a search space identifier of the search space of the BWP of the scheduling serving cell and a search space identifier of the search space of the BWP of the first scheduled serving cell, and wherein the search space of the BWP of the scheduling serving cell and the search space of the BWP of the first scheduled serving cell that are associated with the same search space identifier are linked.

3. The method of claim 1, wherein the configuration information includes a number of the serving cells and DCI format information used for simultaneously scheduling the at least one of the PDSCH or PUSCH of the serving cells.

4. The method of claim 1, wherein the BWP of the first scheduled serving cell is associated with an active BWP.

5. A user equipment (UE), comprising:

at least one transceiver; and at least one processor communicatively coupled to the at least one transceiver; and at least one memory, communicatively coupled to the at least one processor, storing instructions executable by the at least one processor, individually or in any combination, to cause the UE to:

receive, from a base station, configuration information, wherein the configuration information comprises a bandwidth part (BWP) configuration of at least one serving cell and a subcarrier spacing configuration for each BWP, receive, from the base station. downlink control information (DCI) for scheduling at least one of a physical downlink shared channel (PDSCH) or a physical uplink shared channel (PUSCH) of serving cells, identify a first scheduled serving cell among the serving cells, identify a reference frequency domain resource assignment based on a subcarrier spacing configuration of a BWP of the first scheduled serving cell, wherein a search space of the BWP of the first scheduled serving cell is linked with a search space of a BWP of a scheduling serving cell on which the DCI is received; and perform PDSCH reception or PUSCH transmission based on the reference frequency domain resource assignment.

6. The UE of claim 5, wherein the configuration information further comprises a search space identifier of the search space of the BWP of the scheduling serving cell and a search space identifier of the search space of the BWP of the first scheduled serving cell, and wherein the search space of the BWP of the scheduling serving cell and the search space of the BWP of the first scheduled serving cell that are associated with the same search space identifier are linked.

7. The UE of claim 5, wherein the configuration information includes a number of the serving cells and DCI format information used for simultaneously scheduling the at least one of the PDSCH or PUSCH of the serving cells.

8. The UE of claim 5, wherein the BWP of the first scheduled serving cell is associated with an active BWP.

9. A method performed by a base station in a communication system, the method comprising:

transmitting. to a user equipment (UE), configuration information comprising a bandwidth part (BWP) configuration of at least one serving cell and a subcarrier spacing configuration for each BWP:

transmitting, to the UE, downlink control information (DCI) for scheduling at least one of a physical downlink shared channel (PDSCH) or a physical uplink shared channel (PUSCH) of the serving cells; and performing PDSCH transmission or PUSCH reception based on a reference frequency domain resource assignment identified based on a subcarrier spacing configuration of a BWP of a first scheduled serving cell among the serving cells, wherein a search space of the BWP of the first scheduled serving cell is linked with a search space of a BWP of a scheduling serving cell on which the DCI is transmitted.

10. The method of claim 9, wherein the configuration information further comprises a search space identifier of the search space of the BWP of the scheduling serving cell and a search space identifier of the search space of the BWP of the first scheduled serving cell, and wherein the search space of the BWP of the scheduling serving cell and the search space of the BWP of the first scheduled serving cell that are associated with the same search space identifier are linked.

11. The method of claim 9, wherein the configuration information includes a number of the serving cells and DCI format information used for simultaneously scheduling the at least one of the PDSCH or PUSCH of the serving cells.

12. The method of claim 9, wherein the BWP of the first scheduled serving cell is associated with an active BWP.

13. A base station, comprising:

at least one atransceiver; and at least one processor communicatively coupled with the at least one transceiver; and at least one memory. communicatively coupled to the at least one processor. storing instructions executable by the at least one processor individually or in any combination to cause the base station to:

transmit, to a user equipment (UE), configuration information comprising a bandwidth part (BWP) configuration of at least one serving cell, and a subcarrier spacing configuration for each BWP.

transmit, to the UE, downlink control information (DCI) for scheduling at least one of a physical downlink shared channel (PDSCH) or a physical uplink shared channel (PUSCH) of serving cells, and perform PDSCH transmission or PUSCH reception based on a reference frequency domain resource assignment identified based on a subcarrier spacing configuration of a BWP of a first scheduled serving cell among the serving cells, wherein a search space of the BWP of the first scheduled serving cell is linked with a search space of a BWP of a scheduling serving cell on which the DCI is transmitted.

14. The base station of claim 13, wherein the configuration information further comprises a search space identifier of the search space of the BWP of the scheduling serving cell and a search space identifier of the search space of the BWP of the first scheduled serving cell, and wherein the search space of the BWP of the scheduling serving cell and the search space of the BWP of the first scheduled serving cell that are associated with the same search space identifier are linked.

15. The base station of claim 13, wherein the configuration information includes a number of the serving cells and DCI format information used for simultaneously scheduling the at least one of the PDSCH or PUSCH of the serving cells.

16. The base station of claim 13, wherein the BWP of the first scheduled serving cell is associated with an active BWP.

* * * * *